(12) United States Patent
Moriarty et al.

(10) Patent No.: US 7,927,023 B2
(45) Date of Patent: Apr. 19, 2011

(54) OPTICAL FIBRE CONNECTOR

(75) Inventors: Thomas Moriarty, Cork (IE); John Douglas Lambkin, County Cork (IE)

(73) Assignee: Firecomms Limited, Cork (IE)

( * ) Notice: Subject to any disclaimer, the term of this patent is extended or adjusted under 35 U.S.C. 154(b) by 0 days.

(21) Appl. No.: 12/734,115

(22) PCT Filed: Oct. 13, 2008

(86) PCT No.: PCT/IE2008/000100
§ 371 (c)(1),
(2), (4) Date: Apr. 12, 2010

(87) PCT Pub. No.: WO2009/047746
PCT Pub. Date: Apr. 16, 2009

(65) Prior Publication Data
US 2010/0209053 A1  Aug. 19, 2010

(30) Foreign Application Priority Data
Oct. 12, 2007 (IE) .................................. 2007/0746

(51) Int. Cl.
*G02B 6/36* (2006.01)
*G02B 6/38* (2006.01)
*G02B 6/00* (2006.01)
(52) U.S. Cl. ................ 385/53; 385/62; 385/81; 385/90; 385/139
(58) Field of Classification Search .................... 385/62, 385/81, 90
See application file for complete search history.

(56) References Cited

U.S. PATENT DOCUMENTS

| 4,162,119 | A | 7/1979 | Goodman |
| 5,185,839 | A | 2/1993 | Newell |
| 6,074,103 | A * | 6/2000 | Hargreaves et al. ............ 385/90 |
| 6,167,184 | A | 12/2000 | Kikuchi |
| 6,431,763 | B1 | 8/2002 | Shermann |
| 6,692,287 | B2 * | 2/2004 | Yasuda ......................... 439/352 |
| 2003/0091820 | A1 | 5/2003 | Robbins |
| 2003/0128953 | A1 | 7/2003 | Marion |

OTHER PUBLICATIONS

Anonymous, "Fiber Optic connector with built-in shutter," Research Disclosure, Mason Publications, Mar. 1, 1987, vol. 275, No. 6.

* cited by examiner

*Primary Examiner* — Uyen-Chau N Le
*Assistant Examiner* — Chris H Chu
(74) *Attorney, Agent, or Firm* — Jacobson Holman PLLC (57) ABSTRACT

A connector receives and grips an optical fiber in registry with an optical element. Pivoting portions are held in default inoperative position by the spring action of molded hinges, at which position two shutter portions meet, so forming a shutter preventing the ingress of dirt to the optical element. As the optical liber is pushed a small distance into the connector, the pivoting portions are caused to pivot a small amount about the hinges, bringing teeth into contact with the outside jacket of the fiber. The bodies of the inserts are forced radially away from the central axis of the connector, so providing a leaf spring force which keeps the teeth engaged with the jacket of the fiber. The shutter portions move out of the way of the fiber and the spring action applies a force to draw the fiber further into the body of the connector.

23 Claims, 9 Drawing Sheets

Section X-X

OPTICAL FIBRE CONNECTOR

This is a national stage of PCT/IE08/000100 filed Oct. 13, 2008 and published in English, which has a priority of Irish no. 2007/0746 filed Oct. 12, 2007, hereby incorporated by reference.

FIELD OF THE INVENTION

The invention relates to a connector for receiving an optical fibre and retaining it in engagement with an optical element or another fibre.

PRIOR ART DISCUSSION

At each end of the optical fibre, a plug is usually fitted, and this plug is designed to mate with a connector on the equipment. The connector is designed to hold the end of the fibre at the correct position in front of an optical element, so that light can pass from one to the other. The optical element may be a light source or detector, an electro-optical converter, another light guide etc.

It is known to provide a connector in which the optical fibre cable may be inserted directly into the connector without the necessity to fit a plug to the end of the cable. In some such systems the fibre may be retained in the connector by the operation of a mechanism such as a screw or clamp, which must be released again to remove the fibre; the necessity to operate the mechanism makes the use of such connectors awkward, especially for people not familiar with such connectors. In other arrangements such as that of U.S. Pat. No. 6,431,763 the fibre is retained by friction or by a clip with a sharp edge that engages in the jacket of the fibre. Such systems are simpler to use, but have a number of disadvantages. They allow the fibre to be partially inserted without being pushed fully home to the correct position. As the jacket of the fibre is somewhat elastic, the fibre will tend to move back a little after the insertion force is released, so leaving an undesirable gap between the end of the fibre and the optical element. Also, if any load comes on the fibre in a direction to withdraw it from the connector, it is likely to move out to some extent, until sufficient friction force is accumulated, or until the clip is sufficiently engaged in the jacket, to provide a retaining force. Further, it is difficult, or a tool is required, to remove the optical fibre cable if it is required to disconnect it.

The invention is directed towards providing an improved connector.

SUMMARY OF THE INVENTION

According to the invention, there is provided an optical connector comprising:
  a housing,
  at least one socket to receive a fibre termination, and
  at least one latch for each socket, the latch having a biased gripping element, movable between an inoperative position and an operative position,
  wherein in the operative position the gripping element engages the fibre and urges it under the bias further into the socket,
  wherein the action of the fibre being inserted into the socket causes the gripping element to switch in a toggle-like action from the inoperative position to the operative position, and
  wherein the action of the fibre being removed from the socket causes the gripping element to switch in a toggle-like action from the operative position to the inoperative position.

In one embodiment, the gripping element is biased to the inoperative position in the absence of a fibre in the socket.

In one embodiment, the gripping element is pivotable about a pivot joint.

In one embodiment, the joint is free to move towards and away from the axis of socket.

In one embodiment, the latch comprises an actuating arm for initiating movement of the gripping element from the inoperative position to the operative position.

In one embodiment, the actuating arm extends into the socket in a path of the fibre so that as a fibre is pushed into the socket it pushes the actuating arm, in turn causing movement of the gripping element, and wherein the actuator arm is biased to a default closed position in the socket.

In one embodiment, the connector comprises a shutter mechanism arranged to form a barrier to exclude dirt when there is no fibre in the socket, but is moved aside by the action of inserting a fibre.

In another embodiment, the actuating arm forms the shutter.

In one embodiment, the actuating arm is integral with the gripping element.

In another embodiment, the gripping element and the actuating arm are at a fixed acute angle with respect to each other.

In one embodiment, the gripping element is biased by a leaf spring in the operative position.

In one embodiment, the gripping element is biased by the leaf spring to the inoperative position when a fibre is not present in the socket.

In a further embodiment, the leaf spring biases the actuator arm to form a shutter in the inoperative position by default when a fibre is not present in the socket.

In one embodiment, the leaf spring extends generally in the axial direction of the socket.

In one embodiment, the leaf spring is a support element for the latch.

In one embodiment, the leaf spring is a discrete spring which contacts the gripping element and the actuator arm at a surface configured to provide both biases depending on where the spring contacts said surface.

In one embodiment, the gripping element pivots on an integral hinge connecting the gripping element to a support element.

In one embodiment, the integral hinge provides bias to the inoperative position.

In one embodiment, the integral hinge biases the actuating arm into the shutter position.

In one embodiment, the gripping element is biased by resilience of material of a support element of the latch.

In one embodiment, the gripping element is connected to a pivot joint by a resilient support, said resilient support being adapted to provide bias on the gripping element in the operative position.

In one embodiment, the gripping element has one or more sharp ridges or points for engaging in the jacket of the fibre.

In a further embodiment, the gripping element has a material with a high co-efficient of friction, for gripping the outside of the fibre.

In one embodiment, the connector comprises a plurality of latches arranged around the circumference of the socket.

In one embodiment, the connector comprises a metallic element which provides electrical shielding for the optical element.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Referring to FIGS. 1 to 4 a connector 50 is illustrated, for receiving an optical fibre F in a socket 51. The connector 50 has a moulded plastics housing 52, containing an optical element 53 and a pair of moulded plastics latches having insert elements 20 and 30 of a pair of opposed latches in place in the connector on diametrically opposed sides of the socket 51. The housing 52 includes a tapered entrance 54 to guide an optical fibre F, which may be inserted into the socket 51. The optical element 53 includes a lens 58 for coupling light between the optical element 52 and the optical fibre F, and a conical section 57, which can serve to guide the end of the fibre F into alignment with the lens 58.

The latches each comprise moulded plastics hinges 21 and 31 which are integral with the insert elements 20 and 30, joining the insert elements 20 and 30 to pivoting portions 22 and 32. The pivoting portions include gripping elements, in this case teeth, 23 and 33, as well as actuator arms in the form of shutter portions 24 and 34.

Figure 1:
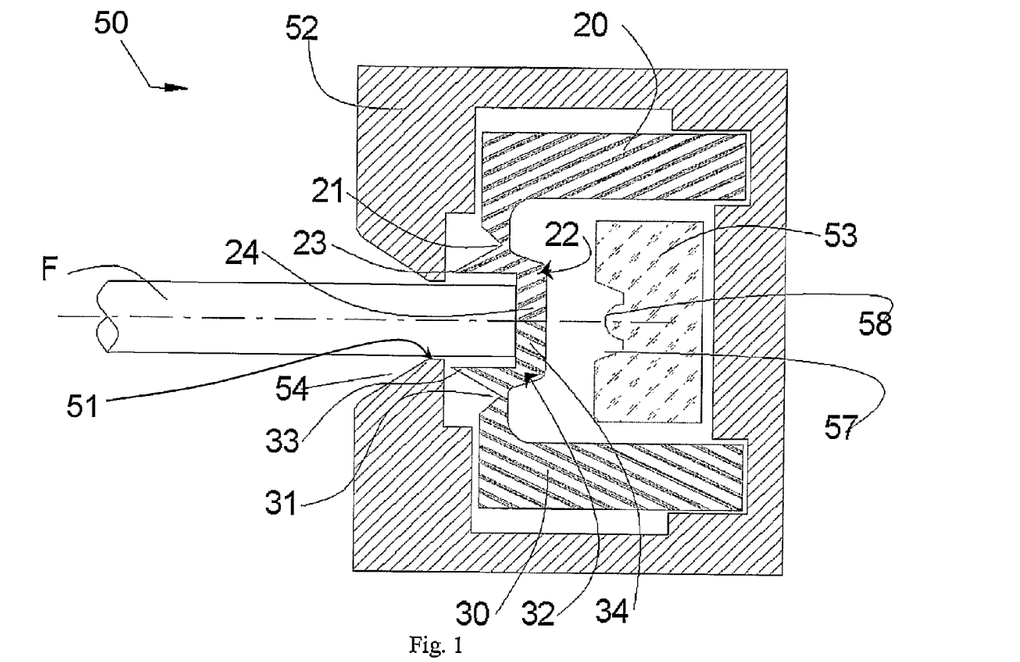
FIGS. 1 to 4 are a series of cross-sectional diagrams illustrating a connector and operation of a latch of the connector.

In FIG. 1 the optical fibre F has been placed in the entrance of the socket 51, but no force has been applied to any element of the connector 50. The pivoting portions 22 and 32 are held by a bias force in a default closed position across the path of the fibre F by spring action of the moulded hinges 21 and 31. The two shutter portions 24 and 34 meet, so forming a shutter preventing the ingress of dirt to the optical element. This is the default position when the connector is not being used.

Figure 2:
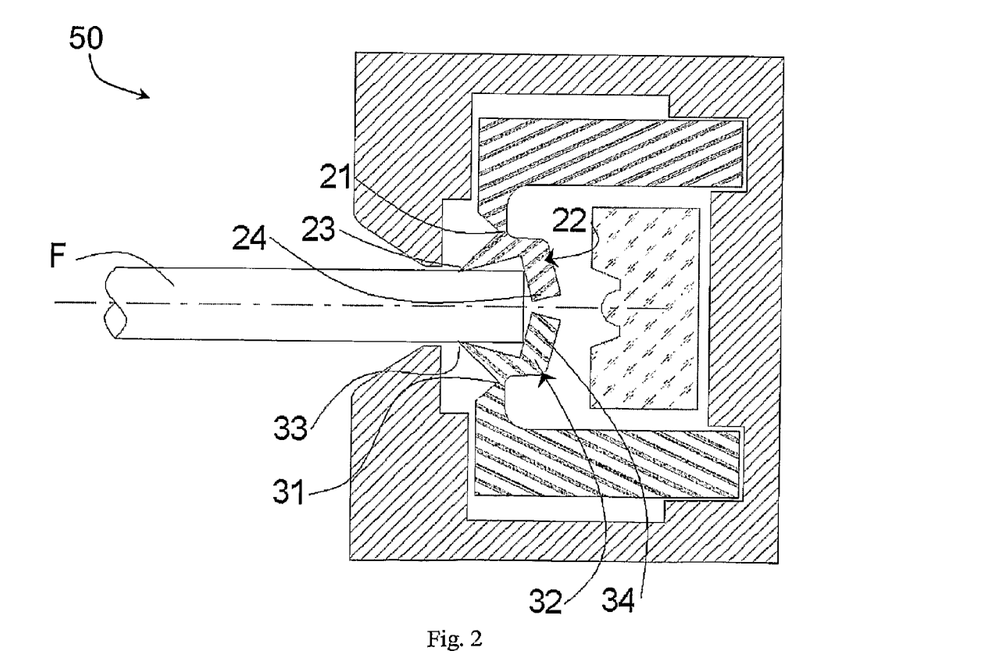

FIG. 2 shows the situation where the optical fibre F has been pushed a small distance into the socket 51, so that the pivoting portions 22 and 32 have been caused to pivot a small amount about the hinges 21 and 22. This action brings the teeth 23 and 33 into contact with the outside jacket of the fibre F.

Figure 3:
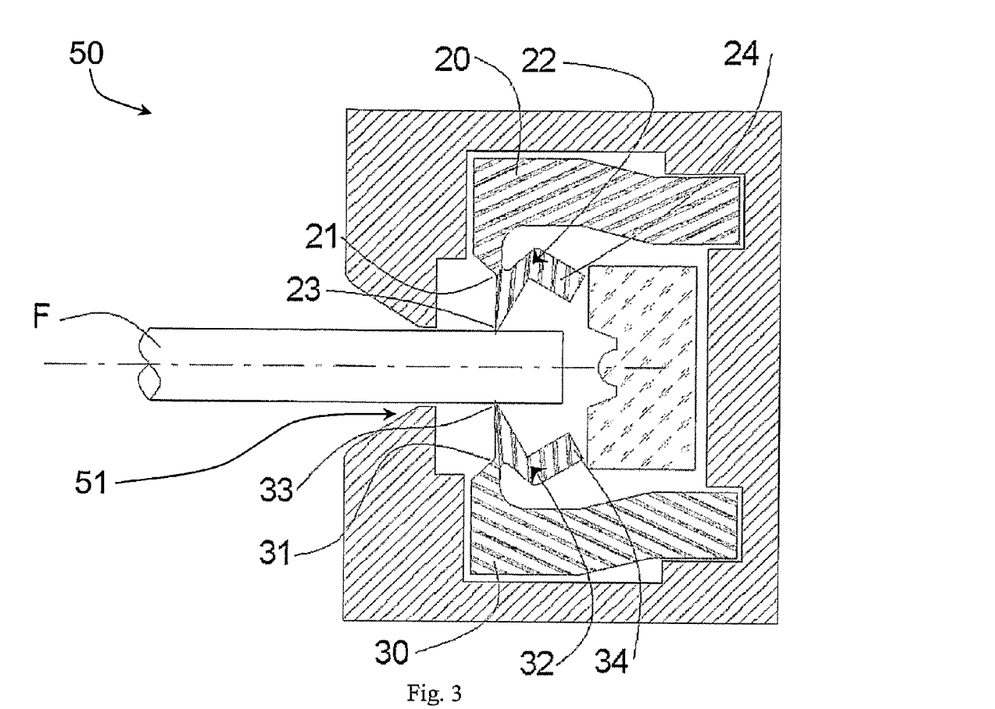

As shown in FIG. 3 when the optical fibre F has been pushed a further distance into the socket 51 the teeth 23 and 33 have engaged in the outside jacket of the fibre F. As the pivoting portions 22 and 32 have moved, the bodies of the inserts 20 and 30 have been forced radially away from the central axis of the socket 51, so providing a leaf spring force which keeps the teeth 23 and 33 engaged with the jacket of the fibre F. The shutter portions 24 and 34 move out of the way of the fibre F. Once the fibre F moves past the point shown in this drawing, the teeth 23 and 33 are inside the hinges, and so the leaf spring action applies a force to draw the fibre F further into the socket.

Figure 4:
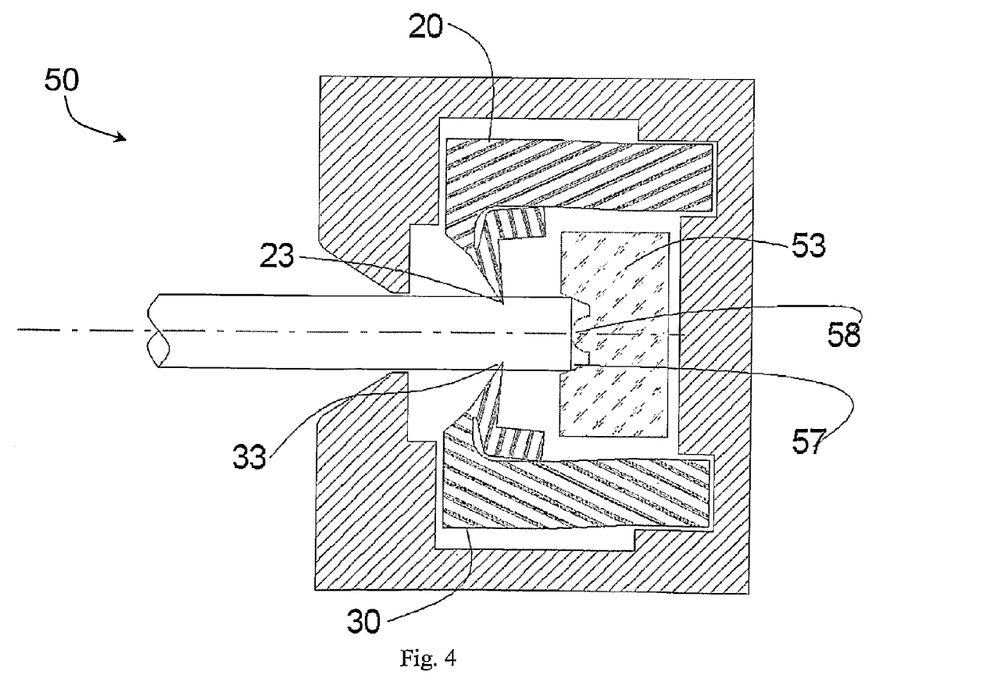

FIG. 4 shows the situation where the optical fibre F has been pushed fully into the socket 51. As the end of the fibre F nears the final position, the conical section 57 of the optical element 53 guides the end of the fibre F to ensure proper alignment between the fibre F and the lens 58. The teeth 23 and 33 remain engaged in the outside jacket of the fibre F. The inserts 20 and 30 have been able to relax partially in the radial direction towards their normal position, but continue to exert a spring force on the teeth 23 and 33 in the leaf spring action. This force acts both to keep the teeth engaged in the jacket of the fibre, and to push the fibre F firmly against the optical element 53, so that the fibre F is held in the connector 50 in the engaged position.

It will be appreciated that once the fibre is fully inserted into the connector, small forces accidentally applied to the fibre will be resisted by this spring force, so that the fibre F continues to be held in the connector 50. However, if it is desired to remove the fibre F from the connector, the pivoting portions move against the leaf spring force of the insert elements 20 and 30 back through the positions shown in FIG. 3 and then further through the positions shown in FIG. 2 until the fibre is released and the connector 50 is shut again as show in FIG. 1. In this position the hinges 21 and 31 provide a bias to the inoperative positions of the latches, with the shutter portions 24 and 34 closed over.

Figure 5:
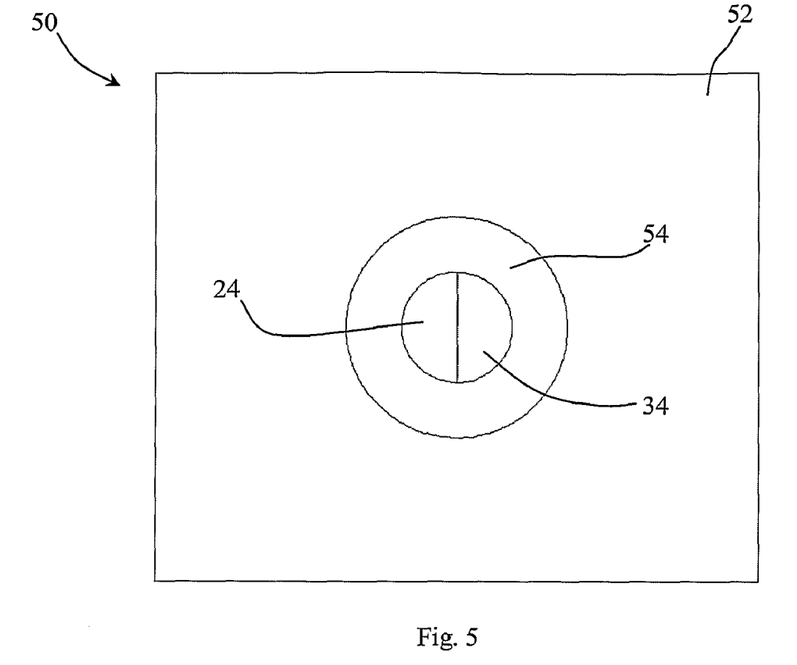
FIG. 5 is a diagrammatic end view of the connector.
Figure 6:
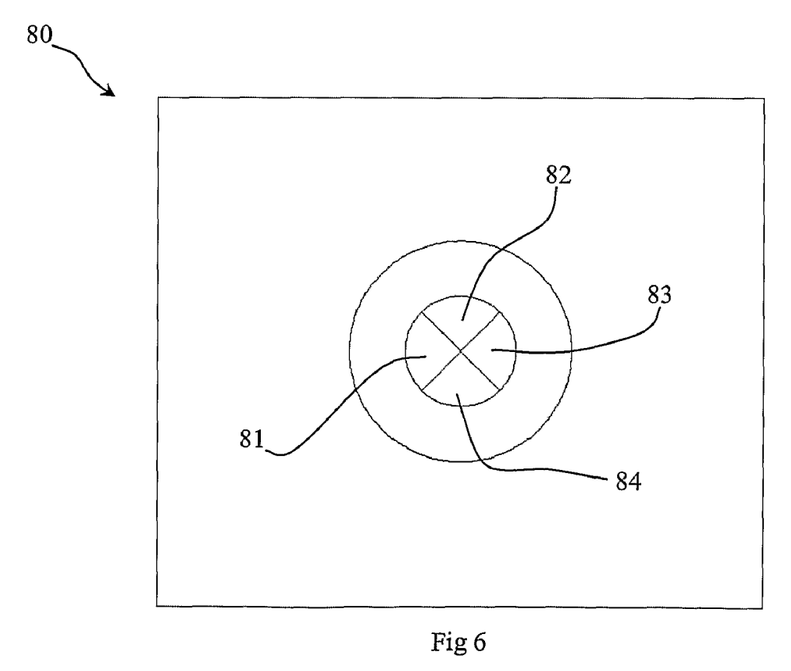
FIG. 6 is a diagrammatic view of an alternative connector arrangement.

The view of the connector in the axial direction is shown in FIG. 5, there being two visible parts of the latches (the shutters 24 and 34) each having a hemispherical shape. Alternatively, as shown in FIG. 6 there may be four latches having quadrant-shaped shutters 81, 82, 83, and 84 each biased in a manner as illustrated in FIGS. 1 to 4. In other embodiments there are a different number of latches, for example three. Also, a single pivoting portion may be used. The latches may be discrete or may be interconnected by a single support insert anchoring them in the housing.

Figure 7:
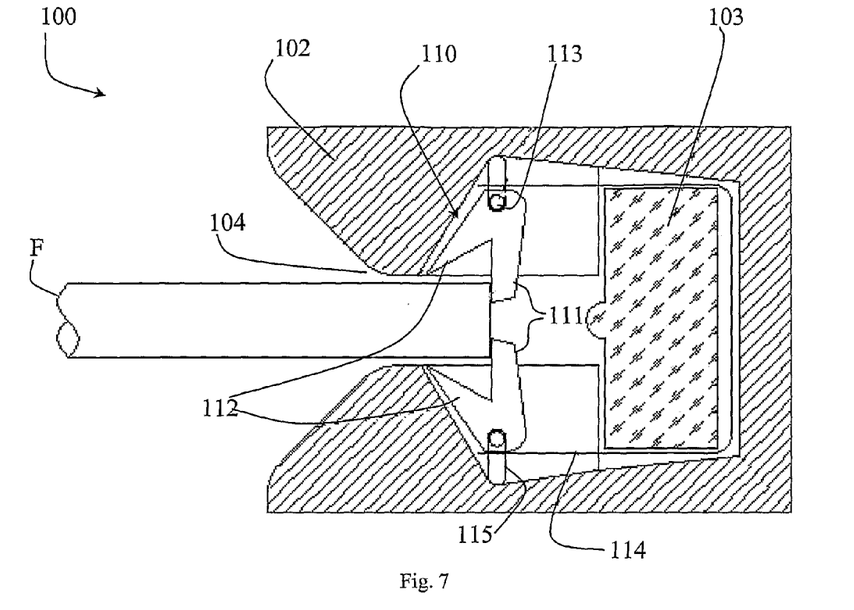
FIGS. 7 to 10 are a series of diagrams illustrating operation of a connector of a second embodiment of the invention.

Referring to FIG. 7 a connector 100 comprises a moulded plastics housing 102, containing an optical element 103. The housing 102 has a socket 104 with a tapered mouth for insertion of a termination of an optical fibre F. Two latches 110 are mounted on opposed sides of the socket 104, each latch 110 comprising:

- an actuator arm 111 integral with a gripping element, in this case a tooth 112, the arm 111 and the tooth 112 extending at acute angles to each other;
- a leaf spring 114 pressing against the integral tooth 112 and arm 111; and
- a pivot pin 113 having freedom of movement radially with respect to a longitudinal axis of the socket along a slot 115.

The pin 113, the spring 114, and the slot 15 together form a pivot joint. This joint allows the tooth 112 to move over-centre from an inoperative position having an axial direction component away from the optical element 103 under bias from the leaf spring 114 to an operative position having a component towards the element 103.

In FIG. 7, the optical fibre F has been inserted until it just touches the actuating arms 111 and the latches 110 are in their open position, the teeth 112 being inoperative. The springs 114 hold the latches in this position when there is no fibre in the connector.

Figure 8:
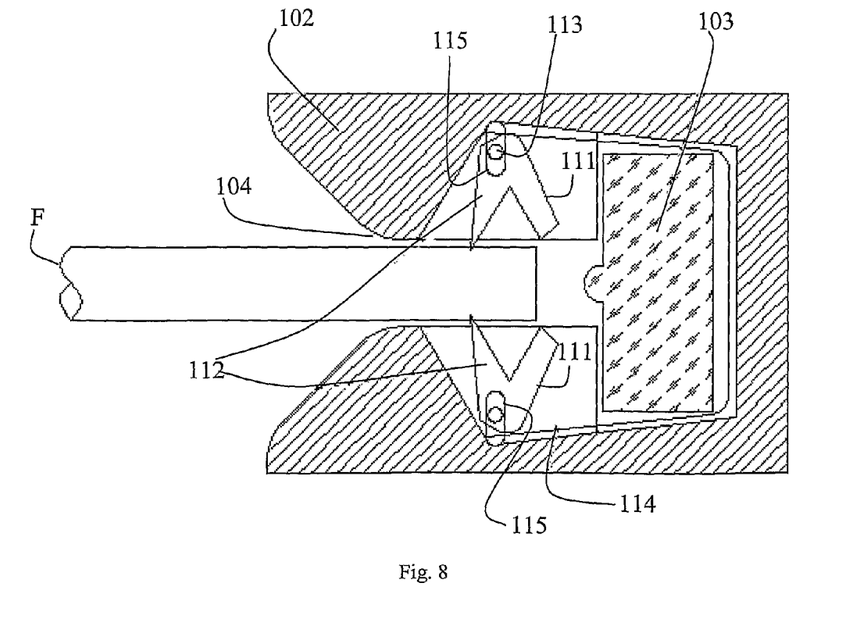

FIG. 8 shows the connector 100 as the optical fibre F is inserted further. As the fibre F moves in from the position shown in FIG. 7, the end of the fibre jacket causes the latches to rotate so that the teeth 112 engage in the jacket of the fibre. This engagement point is some distance from the end of the fibre F, and so the geometry of the end of the fibre will not be distorted.

Figure 9:
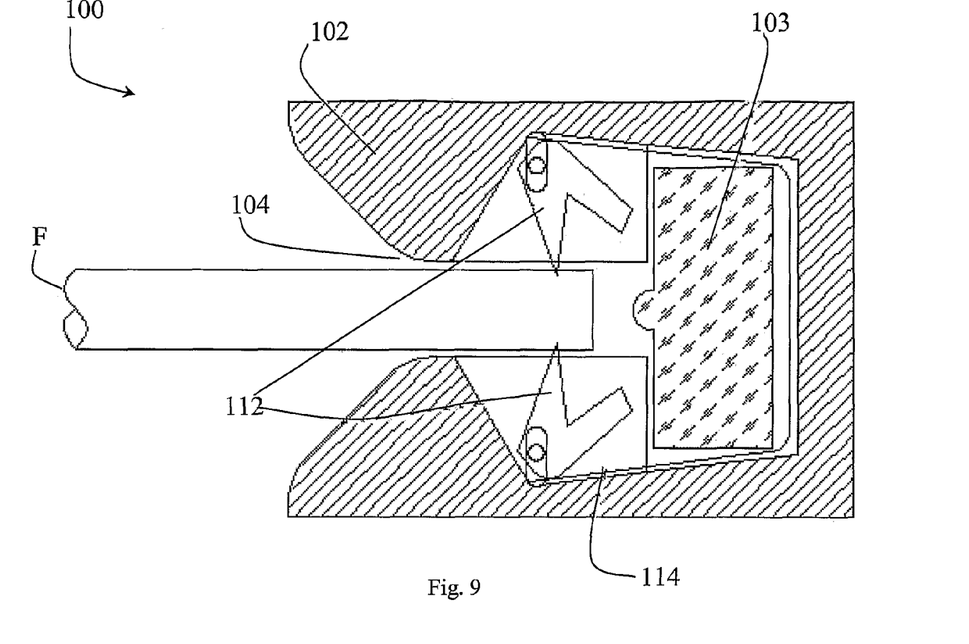
Figure 10:
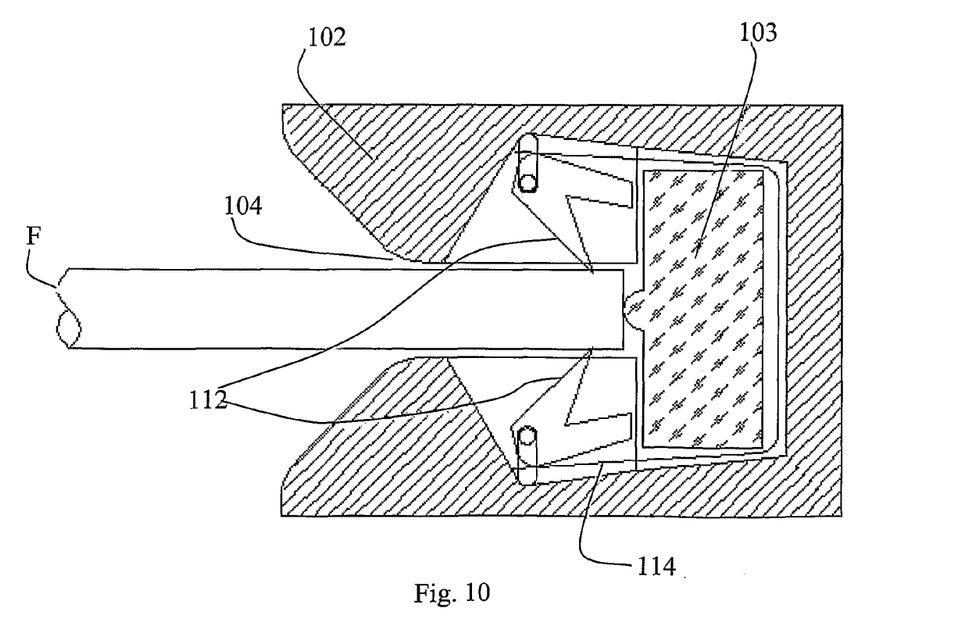

FIG. 9 shows that as the fibre F is pushed further into the housing, the pivoting portions of the latches continue to rotate and reach a point at which the tips of the teeth 112 pass inside the pivot and the point at which the spring is pressing. From this position on the action of the spring 114 is to push the fibre F further into the connector until it reaches the optical device 103, which forms an end stop for its movement. The teeth 112 hold the fibre F firmly in this position, as shown in FIG. 10. This holding force will be sufficient to retain the fibre in the correct position in normal use, but if it is required to remove the fibre, a greater force can be applied to withdraw the fibre. In this case the fibre will come out without any damage that would interfere with it being used again.

The teeth and actuator arms are shown pivoting about the pivot pins 113 that move in the slot 115 in the housing. In another embodiment they may be pivoted from the springs. Also, the metal component used for the spring may form an electro-static or electro-magnetic shield around the optical component.

The optical element may be a light source or detector or a second optical fibre, and if appropriate this may be held in position by a second latch, or set of latches, disposed about a continuation of the cylindrical passage. In this case it may be appropriate to have a barrier in the passage, such as an area where the diameter is reduced or a transparent disc, to limit the movement of the first fibre inserted.

In another embodiment the optical device is itself an assembly, as for example a combination of a light source, a light detector, and a light guide, which serves to guide the light from the light source to the inserted optical fibre, and guide the light coming from the fibre to the detector.

The connector may be constructed to take two or more fibres, coupling each to an appropriate optical element.

In general, the invention in various embodiments includes an optical connector, into which a fibre may be pushed so that:
  For a first distance, the latch resists the fibre, and the act of pushing in does some work in the connector by deflecting one or more elements which act as a spring;
  If the user relaxes in this phase, the fibre will not be properly gripped: either it will be pushed out again by the spring, or at least it will be easy to pull out;
  After a toggle point, the spring works to pull the fibre into the connector. Maybe the fibre is actually pulled in to the connector, or maybe there is still enough friction that the user must continue to push, but at least it must be much easier to push the fibre in for the last part of the movement
  At the end of the movement, there is a dead stop. The fibre cannot be pushed further in, and in this fully inserted position, the spring holds the fibre against the end stop.
  When the user starts to pull the fibre out, the spring resists.
    If the user pulls a small distance and lets go, then the spring will pull the fibre back to the end stop.
    If the user persists in pulling out the fibre, then after the balance point, the fibre comes much more easily from the connector, until it is fully loose.
  The latch mechanism normally remains in the open position with the shutters (if present) across the fibre path. When the fibre is inserted, the mechanism holds it in the closed position. If the user moves the mechanism to the closed position without having a fibre properly in the connector, then the mechanism should not remain in the closed position, but should return to the open position. In other words, the closed position is only stable if there is a fibre properly in the connector. If the mechanism is closed for example, by a user who once inserts a fibre of the wrong size, or an electrical wire, or a pin, or some other accidental means, which is not gripped, the connector should fix itself by returning to the open position when the wrong stimulus is removed, without any additional work by the user to reset the connector.

Figure 11:
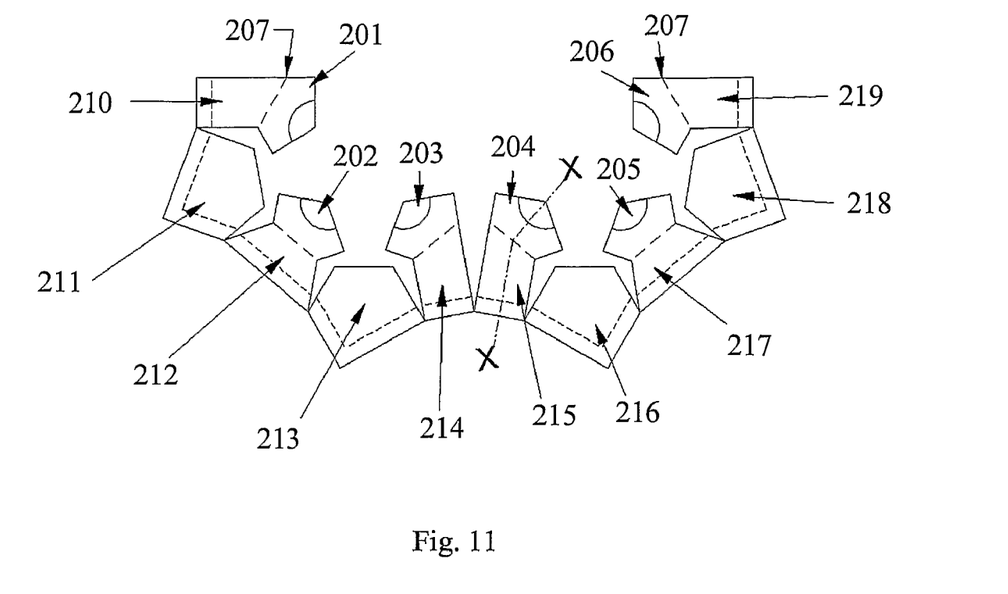
FIG. 11 is a view of alternative pivoting portions for a latch of another embodiment and FIG. 12 is a cross-sectional detail.
Figure 12:
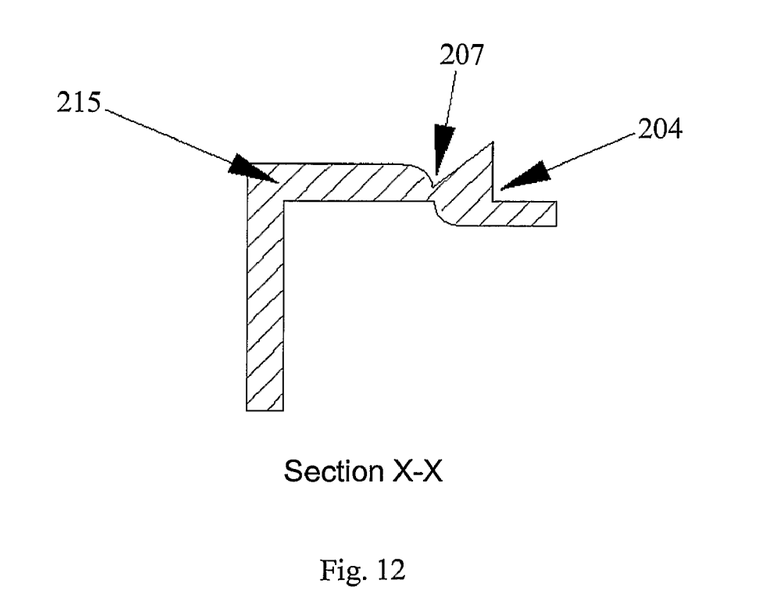
Figure 13:
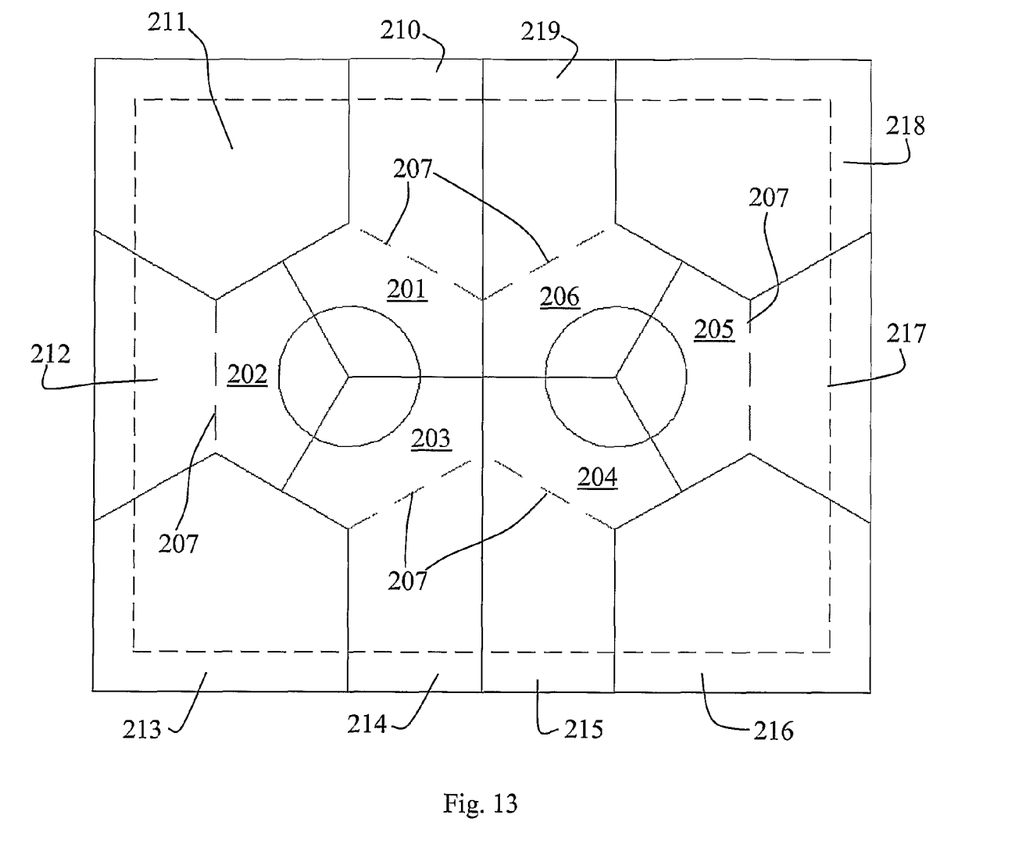
FIG. 13 is a front view of the pivoting portion of FIGS. 11 and 12 in place in a connector as viewed along the axis of the connector's socket.

FIGS. 11 to 13 illustrate how the latches may be economically formed in a single piece for a connector designed to retain two fibres. In this case each fibre is retained by three latches. FIG. 11 shows the one piece insert as moulded. It includes six latch portions, 201 to 206, each connected to the rest of the moulded part by a moulded-in hinge shown by a dashed line such as the lines marked 207. The moulded insert further comprises ten base portions, 210 to 219, each connected to its neighbour(s) by moulded hinges. Base portions 210, 212, 214, 215, 217, and 219 are each connected to one of the six latch portions by the first mentioned moulded hinges.

FIG. 12 shows a cross-section on the line X-X through the base portion 215 and associated latch portion 204, joined by the moulded hinge at 207.

FIG. 13 shows how the hinges between the base portions may be closed, so that the base portions come together to form a rectangular structure, with the pointed ends of three latch portions meeting on one optical axis, and the pointed ends of the other three latch portions meet at the other optical axis. The optical axis is to be understood as the axis of the optical fibre when it has been inserted into the correct position to align with the optical element within the connector.

Figure 14:
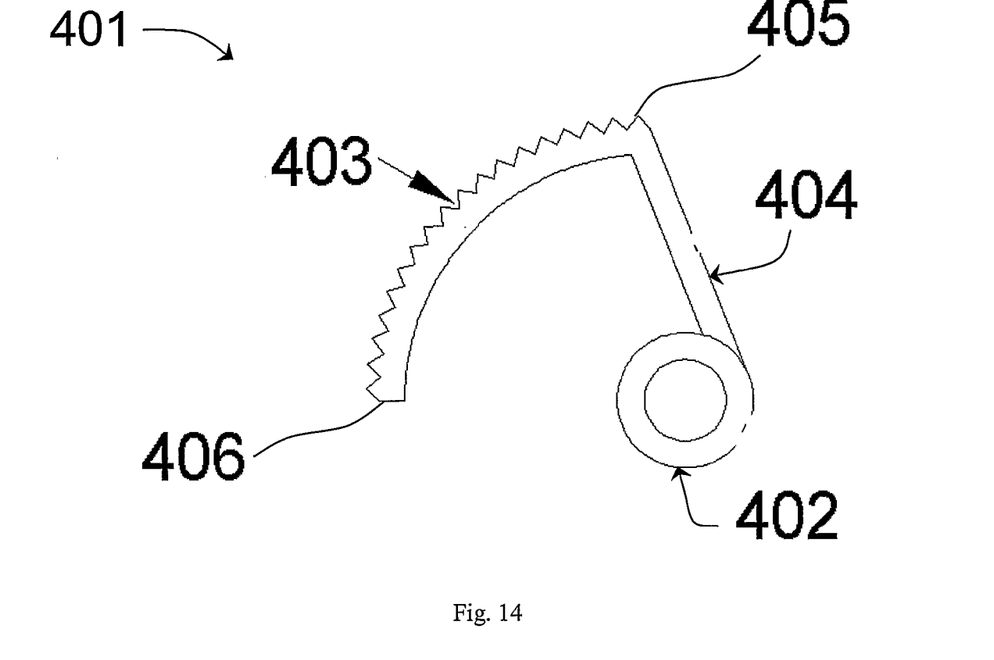
FIG. 14 is a side view of an alternative latch.

In an alternative embodiment, FIG. 14 shows a latch 401 comprising:
  a hub 402 suitable for rotation about a fixed pin,
  a gripping element 403 in the form of a curved surface covered with ridges, and
  a flexible element 404 which joins the gripping element to the hub.

The curve defining the natural shape of the gripping element 403 is not centred on the centre of the hub, but rather is offset, so that the distance from the fixed end 405 of the gripping element to the centre of the hub 402 is less than the distance from the free end 406 of the gripping element 403 to the centre of the hub 402.

Figure 15:
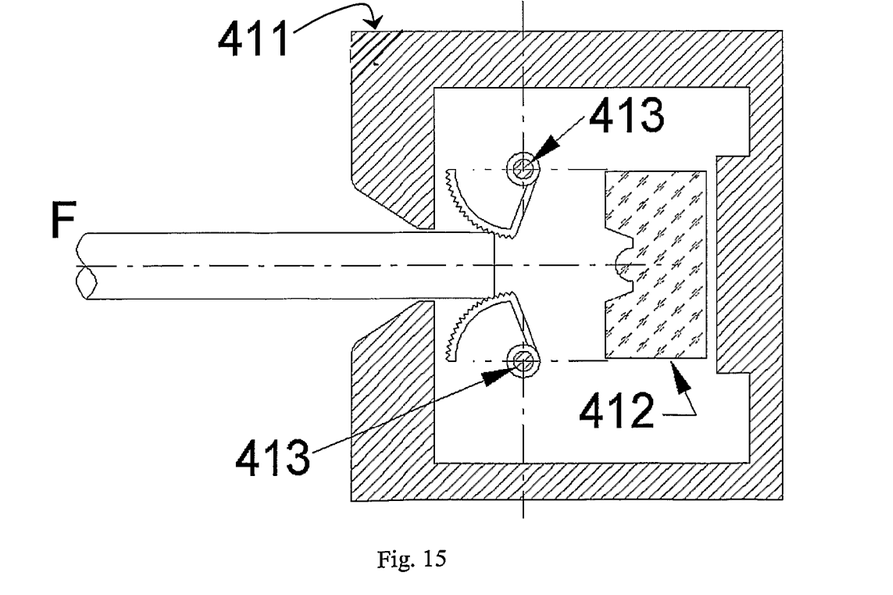
FIGS. 15 to 17 show how the latch of FIG. 14 is employed in a connector.
Figure 16:
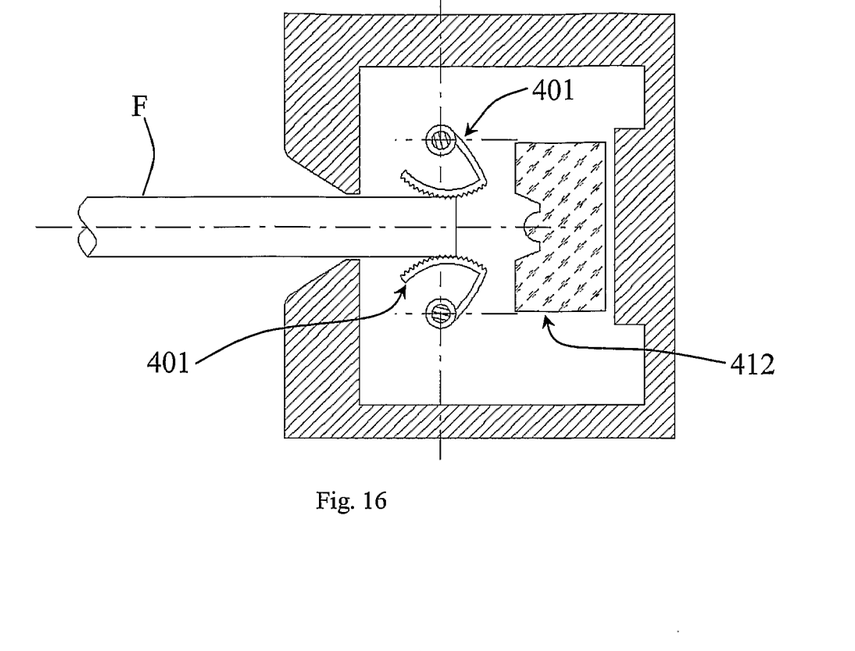
Figure 17:
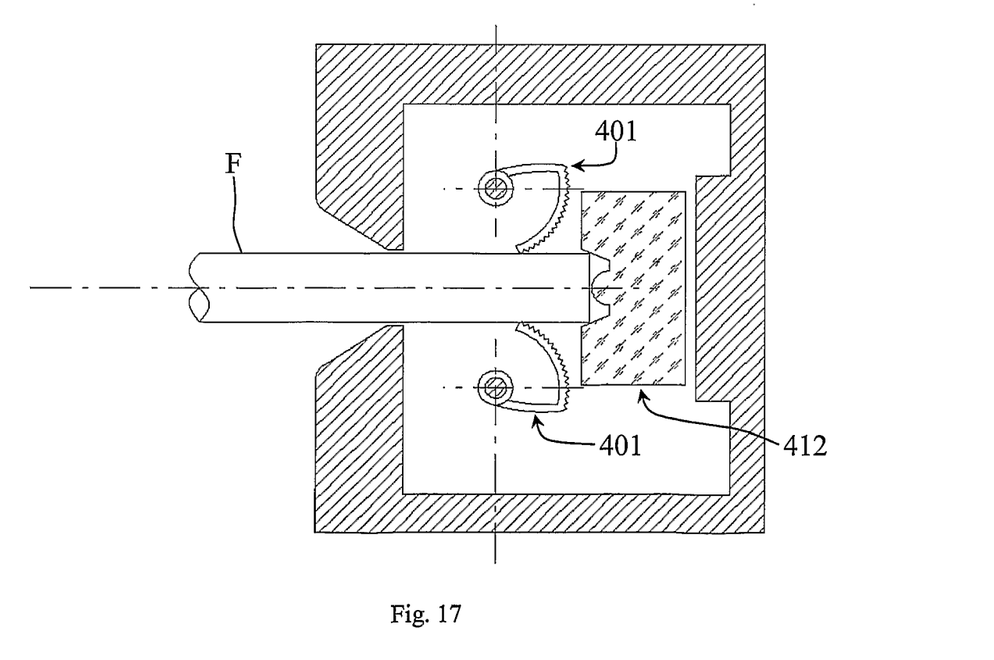

FIGS. 15, 16, and 17 show a pair of such latches mounted in a housing 411 on pins 413 which are fixed to the housing. The housing also contains an optical element 412 aligned with a fibre termination socket.

FIG. 15 shows introduction of an optical fibre into the socket, so that it just makes contact with the latches 401 in their inoperative position. FIG. 16 shows that, as the fibre F is pushed further into the socket, the latches are caused to rotate. Due to the eccentricity of the gripping, surface relative to the centre of rotation of the latch, the flexible element 404 of each latch 401 has to bend to accommodate the fibre. FIG. 17 shows that, as the fibre F is pushed further into the socket, the latches 401 rotate to the situation where the point of contact between the gripping element 403 and the fibre F is further inside the housing than the centres of the pins 413 on which the latches 401 rotate. At this stage the flexible element 404 of the latch biases the gripping element 403 to urge the fibre F further into the connector.

The invention is not limited to the embodiments described but may be varied in construction and detail. For example, the tooth may be biased by resilience of the support elements only, without them deflecting in a leaf spring action. This whole component may be moulded in a single piece in a suitable injection mould. Polypropylene or a similar plastics material may be found suitable for this component. It is also envisaged that the gripping element may move in a translational manner along a guide between the two positions, the guide being curved so that at the top of the trajectory it switches from one position to the other. The gripping element may be in the form of a wheel in this embodiment. Also, the gripping element need not necessarily have a tooth or a ridge. It may instead have merely a high-friction gripping surface. The gripping element may be biased by resilience of material of a support element of the latch, the material compressing during transition between the operative and inoperative positions.

The invention claimed is:

1. An optical connector comprising
a housing,
at least one socket to receive a fiber termination, and
at least one latch for each socket, the latch having a biased gripping element, movable between an inoperative position and an operative position,
wherein in the operative position the gripping element engages the fiber and urges it under the bias further into the socket,
wherein the action of the fiber being inserted into the socket causes the gripping element to switch in a toggle-like action from the inoperative position to the operative position, and
wherein the action of the fiber being removed from the socket causes the gripping element to switch in a toggle-like action from the operative position to the inoperative position,
wherein the latch comprises an actuating arm for initiating movement of the gripping element from the inoperative position to the operative position; and
wherein the actuating arm extends into the socket in a path of the fiber so that as a fiber is pushed into the socket it pushes the actuating arm, in turn causing movement of the gripping element, and wherein the actuator arm is biased to a default closed position in the socket.

2. The connector as in claim 1, wherein the gripping element is biased to the inoperative position in the absence of a fiber in the socket.

3. An optical connector as claimed in claim 1, wherein the gripping element is pivotable about a pivot joint.

4. The optical connector as claimed in claim 1, wherein the joint is free to move towards and away from the axis of socket, and wherein the gripping element is pivotable about a pivot joint.

5. The optical connector as claimed in claim 1, wherein the connector comprises a shutter mechanism arranged to form a barrier to exclude dirt when there is no fiber in the socket, but is moved aside by the action of inserting a fiber.

6. The optical connector as claimed in claim 1, wherein the connector comprises a shutter mechanism arranged to form a barrier to exclude dirt when there is no fiber in the socket, but is moved aside by the action of inserting a fiber; and wherein the actuating arm forms the shutter mechanism.

7. The optical connector as claimed in claim 1, wherein the joint is free to move towards and away from the axis of socket, and wherein the gripping element is pivotable about a pivot joint; and wherein the actuating arm is integral with the gripping element.

8. The optical connector as claimed in claim 1, wherein the joint is free to move towards and away from the axis of socket, and wherein the gripping element is pivotable about a pivot joint; and wherein the actuating arm is integral with the gripping element; and wherein the gripping element and the actuating arm are at a fixed acute angle with respect to each other.

9. The optical connector as claimed in claim 1, wherein the gripping element is biased by a leaf spring in the operative position.

10. The optical connector as claimed in claim 1, wherein the gripping element is biased to the inoperative position in the absence of a fiber in the socket; and wherein the gripping element is biased by the leaf spring to the inoperative position when a fiber is not present in the socket.

11. The optical connector as claimed in claim 1, wherein the joint is free to move towards and away from the axis of socket, and wherein the gripping element is pivotable about a pivot joint; and wherein the actuating arm is integral with the gripping element; and wherein the leaf spring biases the actuator arm to form a shutter in the inoperative position by default when a fiber is not present in the socket.

12. The optical connector as claimed in claim 1, wherein the gripping element is biased by a leaf spring in the operative position; and wherein the leaf spring extends generally in the axial direction of the socket.

13. The optical connector as claimed in claim 1, wherein the gripping element is biased by a leaf spring in the operative position; and wherein the leaf spring is a support element for the latch.

14. The optical connector as claimed in claim 1, wherein the gripping element is biased by a leaf spring in the operative position; and wherein the leaf spring is a discrete spring which contacts the gripping element and the actuator arm at a surface configured to provide both biases depending on where the spring contacts said surface.

15. The optical connector as claimed in claim 1, wherein the gripping element pivots on an integral hinge connecting the gripping element to a support element.

16. The optical connector as claimed in claim 1, wherein the gripping element pivots on an integral hinge connecting the gripping element to a support element; and wherein the integral hinge provides bias to the inoperative position.

17. The optical connector as claimed in claim 1, wherein the gripping element pivots on an integral hinge connecting the gripping element to a support element; and wherein the integral hinge provides bias to the inoperative position; and wherein the integral hinge biases the actuating arm into the shutter position.

18. The optical connector as claimed in claim 1, wherein the gripping element is biased by resilience of material of a support element of the latch.

19. The optical connector as claimed in claim 1, wherein the gripping element is connected to a pivot joint by a resilient support, said resilient support being adapted to provide bias on the gripping element in the operative position.

20. The optical connector as claimed in claim 1, wherein the gripping element has one or more sharp ridges or points for engaging in the jacket of the fiber.

21. The optical connector as claimed in claim 1, wherein the gripping element has a material with a high co-efficient of friction, for gripping the outside of the fiber.

22. The optical connector as claimed in claim 1, wherein the connector comprises a plurality of latches arranged around the circumference of the socket.

23. The optical connector as claimed in claim 1, wherein the connector comprises a metallic element which provides electrical shielding for the optical element.

* * * * *